Patented Dec. 27, 1949

2,492,629

UNITED STATES PATENT OFFICE 2,492,629

ACYLATION OF THIOPHENE

Howard D. Hartough, Pitman, N. J., and Alvin I. Kosak, Columbus, Ohio, assignors to Socony-Vacuum Oil Company, Incorporated, a corporation of New York No Drawing. Application January 10, 1946, Serial No. 640,368

12 Claims. (Cl. 260—329)

This invention relates to a process for the acylation of heterocyclic compounds and more particularly is directed to a method for acylating the five-member heterocyclics such as the thiophenes and furans, in the presence of catalytic amounts of a zinc halide.

Acylation reactions are well known in the art and connote the union between acyl radicals and molecules of organic compounds under conditions of temperature, pressure, and time ordinarily referred to in the art as acylating conditions. The compounds thus produced represent, structurally, the substitution of an acyl radical on the organic compound molecule with the elimination of a hydrogen atom.

As a general rule, the temperature, pressure and time of reaction employed in acylation operations depend upon whether the acylation is effected in the absence or presence of acylation catalysts. The two methods are generally referred to as thermal and catalytic acylation, respectively. The majority of acylation processes fall under the latter category and it is a catalytic acylation process with which the present invention is concerned.

Acyl radicals may be furnished in acylation reactions by various materials commonly referred to as acylating agents. Thus, the anhydrides of carboxylic acids, acyl halides, and acyl nitriles have served as sources of the acyl radical. In particular acetic anhydride and acetyl chloride have found wide application as acylating agents.

The acylation of heterocyclics such as thiophene, furan, and derivatives thereof, has previously been carried out employing one of the above mentioned acylating agents in the presence of various catalysts including aluminum chloride, stannic chlorides, and titanium tetrachloride. Phosphorus pentoxide and 2-chloromercurithiophene have been employed as catalysts in promoting the acylation of thiophene. Other methods of making acylated thiophenes have included dry distillation of calcium salts of thiophene carboxylic acids and the action of nitriles on thienyl magnesium iodide.

Of these processes, the catalytic methods employing Friedel-Crafts type catalyst such as aluminum chloride, stannic chloride, and titanium tetrachloride have been used most extensively. These catalysts although applicable with considerable success in the acylation of aromatic hydrocarbons are only moderately successful where heterocyclics are involved. This appears to be due to the relative instability of the heterocyclic ring; the Friedel-Crafts catalyst, for example ample aluminum chloride, attacking the atom other than carbon of the heterocyclic ring and causing many undesirable secondary reactions with concomitantly low yields of acyl derivatives. Furthermore, it has been postulated that compounds such as aluminum chloride form addition complexes with the carbonyl group of the resulting ketone substantially decreasing the yield of desired product and requiring a considerable excess of aluminum chloride over the theoretical amount required for the acylation process. Thus, when aluminum chloride is used as the condensing agent, the ratio of catalyst to acyl chloride is at least one and, in the case of acid anhydrides at least two. Likewise, other Friedel-Crafts catalysts such as stannic chloride must be used in molecular quantities with respect to the acyl halide being employed in the acylation of heterocyclics, such as thiophene and furan. This is probably due to the fact that acyl halides form comparatively stable molecular complexes with aluminum chloride and stannic chloride, thereby diminishing their catalytic effect. There has been much theoretical discussion in the past as to the reason why acylation reactions employing the Friedel-Crafts type catalyst differ from the alkylation reactions, the latter only requiring minute amounts of catalyst, while the former requires substantial molecular quantities of catalyst with respect to the acylating agent used. Whichever of the theories or postulated mechanisms is the correct one, the fact remains that heretofore relatively large amounts of the Friedel-Crafts type catalyst were necessarily employed in the acylation of heterocyclics if the reaction was to proceed in the desired direction.

Moreover, the use of aluminum chloride as a catalyst in the acylation of heterocyclics entails strict observance of detail in experimental conditions. Thus, it is known that thiophene and aluminum chloride react vigorously in carbon disulfide suspension. It has been reported that a moderately good yield of phenyl-thienyl ketone is obtained by adding a solution of benzoyl chloride and thiophene in carbon disulfide to a suspension of aluminum chloride in the same solvent. If, however, a carbon disulfied solution of the acid chloride was added to a suspension of thiophene and aluminum chloride, much tar was formed and a low yield of ketone resulted. The acylation of thiophene and other heterocyclic compounds such as furan has, accordingly, been an exceedingly difficult reaction to carry out, the usual acylation catalysts causing excessive resinification of the heterocyclic reactant.

The resinification usually occurs before acylation can be effected, and if the expected reaction product is formed, it is generally only in very small amounts. The difficulties inherent in prior art catalytic acylation of heterocyclics were believed to be due, at least in part, to the relatively large quantities of catalyst being employed, that is, amounts of the order of molecular quantities with respect to reactants being used. Attempts were accordingly made to overcome the existent difficulties by the use of traces or catalytic amounts of aluminum chloride comparable to the amounts used in the alkylation reactions. Minute amounts of aluminum chloride so employed failed to produce any of the desired ketone.

It has now been discovered that zinc chloride and, in general zinc halides, behave in a distinctive manner as compared with the other Friedel-Crafts catalysts heretofore used in the acylation of heterocyclics. It has been found that by using a zinc halide catalyst, the above mentioned difficulties encountered in the acylation of thiophenes and furans have largely been overcome. It would appear that the advantages obtained using a zinc halide catalyst can be attributed to the fact that relatively small quantities, that is, less than 1 mole of zinc halide per mole of acylating agent, can be used as effective catalysts in the acylation of thiophene, furan, and derivatives thereof. By employing a zinc halide catalyst in catalytic amounts, the undue resinification and formation of addition complexes formerly encountered in the catalytic acylation of these heterocyclic compounds have been substantially eliminated, the products resulting being almost entirely acyl derivatives having one or more side chains corresponding to that of the acylating agent. It has been found in accordance with this invention that zinc halides employed in quantities not greater than the amount of heterocyclic compound or acylating agent used effect the acylation of said heterocyclic smoothly and specifically in contrast to the more conventional acylation Friedel-Crafts type catalysts employed heretofore, giving a substantial yield of desired ketone without accompanying formation of complex addition products and resinification. The acylation of thiophene and the other heterocyclic compounds using a zinc halide catalyst, moreover, can be carried out in a straight-forward manner without a detailed observance of experimental conditions such as is a necessary precaution to be taken when aluminum chloride is employed as catalyst.

It is, accordingly, an object of the present invention to provide an efficient process for synthesizing acylated heterocyclic compounds. Another object is to provide a process for catalytically acylating thiophenes, furans, and their derivatives. A still further object is to afford a process for catalytically acylating heterocyclics in a straight-forward manner which can be easily carried out using a relatively inexpensive catalyst in minute amounts. A very important object is to provide a process capable of reacting thiophene, furan, or derivatives thereof with an acylating agent in the presence of an efficient catalyst without undue formation of addition complexes between the catalyst and heterocyclic compound or between the catalyst and acylating agent.

These and other objects which will be recognized by those skilled in the art are attained in accordance with the present invention, wherein five-membered heterocyclic compounds, such as, thiophene and furan, are acylated by reaction with organic carboxylic acid anhydrides or acyl halides in the presence of catalytic amounts of a zinc halide.

The zinc halides which have been found to be effective catalysts in the acylation of heterocyclics include the bromide, chloride and iodide. As in many other instances, the fluoride member does not behave consistently and for the purposes of this invention, zinc fluoride is not to be included within the scope of zinc halides as used throughout the present specification and claims. Of the zinc halides, the chloride, being the least expensive and the most easily obtainable, is to be preferred and will generally be used in the process of this invention. The unique catalytic effect of minute amounts of zinc halides in the acylation of thiophenes and furans appears to be strictly limited to the halides of zinc, and cannot be extended to other elements which in some respects behave similarly to zinc. Thus, it has been observed that the catalytic action of zinc halides is not common to halides of other elements in same group of the Periodic Table, as it has been found that mercuric chloride does not effect the acylation of thiophene. Also, as previously pointed out, the action of zinc halides is distinctive, as compared with other of the Friedel-Crafts type catalysts since aluminum chloride in amounts less than 1 mole per mole of acylating agent was found to be ineffective as an acylation catalyst for heterocyclic compounds. While the present invention is not to be strictly limited to any specific small amount of catalyst, generally zinc halide will be employed in amounts of the order of $1/100$ of the amount of the Friedel Crafts catalysts heretofore used in the acylation of heterocyclics, such as thiophene and furan. The quantity of zinc halide used herein may be conveniently expressed in terms of mole ratio as compared with the amounts of reactants used. Thus, the amount of zinc halide used will generally be between about .0001 and about 1 mole per mole of reactant, that is, either heterocyclic or acylating agent, present in least quantity.

It is generally believed that the chemical behavior of thiophene and furan is very similar to that of benzene. However, there are some very striking differences. This is illustrated by the fact that the acylating catalysts ordinarily used in the acylation of benzene are not suitable for the acylation of the heterocyclic compounds. Moreover, catalysts which readily effect the acylation of thiophene and furan will not always effect the acylation of benzene. This particularly true in the present invention. The small quantities of zinc halide which permit the acylation of the heterocyclic to proceed smoothly and efficiently are inactive in the acylation of benzene. As those in the art know, zinc halides, particularly zinc chloride, have been used as acylation catalysts with highly reactive compounds of the phenol type. However, in carrying out these reactions, it has always been necessary to use relatively large quantities of catalyst to effect condensation. The small quantities of zinc halides under the conditions herein employed in the acylation of heterocyclic compounds fail to catalyze the acylation of these compounds. Thus, a small amount of zinc halide, which is inactive catalytically in the acylation of benzene, is, in accordance with the present invention, a preferable catalyst for the acylation of thiophene and furan.

The acylating agents to be used herein may be an organic carboxylic acid anhydride or an acyl halide. Included in the former category are compounds such as the ketenes, having the basic structural formula

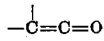

and which, upon addition of water, yield organic carboxylic acids. These acylating agents may be derived by methods well known to the art from mono or dibasic organic acids which may be either unsaturated or saturated. Thus, representative acylating agents to be used in this invention include the anhydrides of saturated fatty acids, such as acetic anhydride, propionic anhydride, etc.; the acyl halides of saturated fatty acids, such as acetyl chloride, stearyl chloride, etc.; the acyl halides of dibasic acids, such as phthalyl chloride; the anhydrides of unsaturated acids, such as crotonic anhydride; and the acyl halides of unsaturated acids, such as crotonyl chloride. These acylating agents are given merely by way of examples and are not to be construed as limiting since other acyl halides or anhydrides of carboxylic acids which will readily suggest themselves to those skilled in the art may likewise be used. It is to be noted that acyl nitriles and carboxylic acids, which have been employed in some acylation reactions, fail to acylate thiophene under the conditions of the present process and, hence, are not to be included herein as acylating agents. In general, the carboxylic acid anhydrides are to be preferred, since a greater yield of ketone was obtained when these were employed in the acylation reaction.

Thiophene, furan, and derivatives thereof may be acylated in accordance with this invention. Thus, the 2- and 5-positions in the thiophene ring, being adjacent to the sulfur atom, are generally much more reactive than the 3- and 4-positions and, in acylating thiophene, the entering acyl group will preferably attach itself to the carbon atom adjacent to the sulfur. When the 2-position of the thiophene ring is already occupied by a substituent group or atom, the position at which the entering acyl group attaches itself depends on the nature of the substituent group. Thus, if the 2-position is occupied by an alkyl, aryl, halogen, alkoxy or, in general, by any of the atoms or groups commonly referred to by those in the art as ortho-para directing, the acyl substituent enters almost entirely in the 5-position. When such groups occupy the 3-position, the acyl substituent will enter for the most part at the 2-position.

In some instances, a small portion of the 3,5 product may be obtained. Heterocyclic derivatives, on the other hand, having electronegative substituents in the 2-position, such as carbonyl, carboxylic ester, nitro, cyano, and, in general, groups commonly referred to as meta directing, will have the entering acyl group occupy almost entirely the 5-position. The later type of reaction, that is, acylation of heterocyclic derivatives having an electronegative susbtituent on the ring, is another distinguishing feature in the acylation of the heterocyclics as compared with that of benzene, since, in the latter case, the presence of an electronegative group on the benzene ring of the type mentioned would inhibit the introduction of an acyl group. In other words, generally speaking, heterocyclic derivatives having an electronegative substituent can be acylated in accordance with this invention, while benzene derivatives cannot.

The acylation of thiophene and furan may be carried out employing equimolar quantities of heterocyclic and acylating agent. However, the presence of an excess of one of the reactants has been found to give an increased yield of the desired product. Thus, experiments identical in all respects, except reactant ratio, showed that an acetic anhydride-thiophene ratio of 2:1 resulted in appreciably higher conversions to ketone, that is, about 1.5 to 1.7 times the amount obtained when equimolar quantities were used. Similarly, an excess of thiophene or other heterocyclic also raises the yield of ketone. As is to be expected, other factors remaining constant, the rate of reaction will generally be more rapid when an excess of one of the starting materials is present.

However, other factors remaining constant, the reaction rate is largely a function of the temperature, the upper limit of temperature being dependent on the boiling point of the reactants at the specific pressure of the reaction. In general, temperatures between about —30° C. and about 150° C. and pressures varying between atmospheric and about six atmospheres have been found satisfactory for effecting the acylation reaction. The effect of increased pressure, theoretically, is toward increased reaction, but from a practical standpoint this is not a very great effect with reactions such as involved herein which go readily at normal pressures. The temperature to be employed will depend on the time of reaction and the nature of the acylating agent and heterocyclic employed. Generally, the lower temperatures will be employed when acyl halides are used as acylating agents. Also, the lower temperatures, particularly in the range of from about 0 to about 15° C. were found to be effective when furan or its derivatives were acylated. Ordinarily, a pressure sufficient to maintain the reactants in the liquid phase is employed and this is more or less dependent on the particular temperature involved. As a general rule, the higher the temperature, the higher the pressure and the lower the reaction time that may be used. It is, of course, to be understood that these reaction variables are more or less interdependent. Under the conditions encountered in the process of this invention, however, the reaction period will generally vary from about 1 to about 10 hours.

The zinc halides employed herein in minute amounts, as catalysts for the acylation of heterocyclic compounds, may be either in a fused or moist condition. Heretofore, when employing zinc halides, as for example in the acylation of highly reactive compounds of the phenol type, it has been necessary to use a fused zinc halide. In the process of the present invention, however, it has been found that even moist zinc halide effects the reaction. Apparently, the catalyst is dehydrated by the acylating agent during the course of the reaction. While dehydration would also occur in previously reported acylations, the large amount of catalyst employed therein would necessitate the use of a correspondingly great excess of the acylating agent if zinc halide, which had not been previously desiccated, was utilized. The amount of acid anhydride or acyl halide consumed in dehydrating moist catalyst in the present process is insignificant due to the small quantities of catalyst used. Thus, in addition to advantages previously pointed out for small quantities of zinc halide as catalysts in the acylation of heterocyclics, another distinctive advantage is that the step of fusing or desiccating the zinc halide catalyst prior to use can be eliminated if so desired.

The following detailed examples are for the purpose of illustrating modes of effecting the acylation of heterocyclic compounds in accordance with the process of this invention. It is to be clearly understood that the invention is not to be considered as limited to the specific acylating agents disclosed hereinafter or to the particular conditions set forth in the examples.

Example 1

A mixture of 84 grams (1 mole) of thiophene, 107 grams (1 mole) of 95% acetic anhydride and 1 gram (.0074 mole) of zinc chloride was refluxed with stirring for 2.2 hours, the temperature rising from an initial value of 85° C. to 114° C. during this period. The product was water-washed, neutralized with sodium carbonate solution, again water-washed and dried over activated alumina. The material was then distilled, 60 grams (47.6% of theory) of 2-acetylthiophene boiling at 76° C. under 3.2 millimeters pressure was collected.

Example 2

To a mixture of 34 grams (0.5 mole) of furan and 107 grams (1 mole) of 95% acetic anhydride was added 2.0 grams (.015 mole) of fused zinc chloride. The mixture was then heated slowly to 35° C. Some heat of reaction was noted and the temperature rose to 37° C. and at the end of about 30 minutes began to fall. The mixture was then heated to 60° C. in an additional 30 minutes. The temperature of 60° C. was maintained for 30 minutes. The reaction mixture was then cooled, diluted with 100 milliliters of chloroform, water-washed, and washed finally with a sodium carbonate solution to remove last traces of acetic acid. Distillation yielded 21.5 grams (40% of theory) of 2-acetylfuran.

Example 3

A mixture of 107 grams (1 mole) of 95% acetic anhydride, 42 grams (0.5 mole) of thiophene and 1.5 grams (.011 mole) of zinc chloride was refluxed with stirring at 104-125° C. for 2 hours. The product was treated as in Example 1 and 42 grams (66.7% of theory) of 2-acetylthiophene was obtained.

Example 4

A mixture of 63 grams (0.5 mole) of 2-acetylthiophene, 107 grams (1.0 mole) of 95% acetic anhydride and 2.0 grams (.015 mole) of zinc chloride was heated with stirring at 100-105° C. for two hours. The reaction mixture was then decanted from the small amount of sludge clinging to the walls of the flask, water-washed and distilled in vacuo. A quantity of 41 grams of 2-acetylthiophene was recovered and 5 grams (6.0% of theory) of crystalline material, boiling in the range of 138 to 145° C. under 5 mm. pressure, was collected in the condenser. When purified by dissolving in ethyl acetate, treating with decolorizing charcoal and recrystallizing by the addition of petroleum ether to the ethyl acetate solution, pure white crystals of 2,5-diacetylthiophene were obtained having a melting point of 169-170° C. The 2,4-dinitrophenylhydrazone of this product had a melting point of 300-301° C.

Example 5

To 107 grams (1.0 mole) of 95% acetic anhydride, well-cooled in ice, were added 34 grams (0.5 mole) of furan. The mixture was cooled to 0-5° C. and 2 grams (.015 mole) of zinc chloride was added. The temperature was maintained at 0-5° C. for 1 hour and then maintained at 15-20° C. for 3 hours longer. The reaction mixture was then washed with water and sodium carbonate solution. Upon distillation, 36 grams (66% of theory) of 2-acetylfuran were obtained.

Example 6

A mixture of 78 grams (1 mole) of acetylchloride, 84 grams (1 mole) of thiophene and 1 gram (.0074 mole) of zinc chloride was stirred at 25 to 30° C. for 3 hours. The product was water-washed, neutralized with sodium carbonate solution, again water-washed and dried. The material was then distilled, 9 grams (7.1% of theory) of 2-acetylthiophene were obtained.

Example 7

A mixture of 84 grams (1 mole) of thiophene, 107 grams (1 mole) of 95% acetic anhydride and 0.14 gram (.001 mole) of zinc chloride was refluxed for 4 hours at 105-125° C. The product was water-washed, neutralized with sodium carbonate solution, again water-washed and dried. Distillation yielded 60.5 grams (48% of theory) of 2-acetylthiophene.

Example 8

A mixture of 84 grams (1 mole) of thiophene, 107 grams (1 mole) of 95% acetic anhydride and 0.054 gram (.0004 mole) of zinc chloride was refluxed for 4 hours at 105-125° C. The product was washed with water and sodium carbonate solution and then dried. Upon distillation, 15 grams (12% of theory) of 2-acetylthiophene were obtained.

Example 9

To a mixture of 84 grams (1 mole) of thiophene and 107 grams (1 mole) of 95% acetic anhydride were slowly added 14 grams (0.1 mole) of zinc chloride. A spontaneous heat of reaction was noted and the temperature rose from 30° C. to 95° C. before it subsided. The reaction mixture was then heated at 120-125° C. for 4 hours. At the end of this period, the mixture was cooled, washed with water and sodium carbonate solution. Distillation yielded 84 grams (68% of theory) of 2-acetylthiophene.

Example 10

To a mixture of 84 grams of thiophene and 110 grams of 95% acetic anhydride were added 2.25 grams (0.01 mole) of zinc bromide. No heat of reaction was noted. The reaction mixture was heated to a reflux, gradually rising from 106 to 119° C. over a period of four hours. At the end of this period the mixture was cooled, washed with water and sodium carbonate solution. Distillation yielded 75 grams (60% of theory) of 2-acetylthiophene.

Example 11

To a mixture of one mole of thiophene and one mole of 95% acetic anhydride was added 0.5 mole (68 grams) of zinc chloride. The temperature at the time of addition was 30° C. An exothermic reaction caused the temperature to reach 105° C. in about five minutes. The temperature rose further to 107° C. in an additional five minutes and then began to fall. The reaction mixture was then cooled to room temperature, water-washed immediately and distilled to give 97 grams (77% conversion) of 2-acetylthiophene.

*Example 12*

Example 11 was repeated using benzene in place of thiophene. No heat of reaction was noted. After refluxing three hours, no acetophenone could be isolated from the reaction mixture, indicating that benzene cannot be acylated in the presence of the small amounts of zinc chloride which function as effective catalysts in promoting the acylation of furan and thiophene.

*Example 13*

To 1.0 mole of thiophene and 1.0 mole of acetic anhydride were added 1.0 gram (0.0077 mole) of anhydrous aluminum chloride. A gelatinous precipitate formed immediately. After refluxing for two hours, no acetylation was found to take place. This was substantiated by testing the refluxed material with sodium nitroprusside, which is considered to be reliable in detecting concentrations of 1 part per thousand of 2-acetylthiophene. The test was negative, indicating that minute amounts of aluminum chloride do not catalyze the acetylation of thiophenes.

From the above Examples 1 to 11, it will be evident that small amounts of zinc halide are effective catalysts for the acylation of heterocyclic compounds such as furan and thiophene. In Example 4, it was shown that a thiophene derivative having an electronegative substituent on the ring, namely, an acetyl group could be further acylated using small amounts of zinc chloride catalyst. The results of Example 12 indicate that benzene cannot be acylated under the conditions of present invention, while the results of Example 13 indicate that comparably small amounts of other metallic halide catalysts, such as aluminum chloride, do not behave catalytically in promoting the acylation of heterocyclic compounds.

While the present invention, of course, is not to be limited by any theory, it would appear that zinc chloride does not form the addition complexes between heterocyclic compounds such as thiophene and furan and/or the resulting acylated product as have been postulated with other of the metallic halides heretofore used in the acylation of heterocyclics. The acylation reactions using these previously employed catalysts evidently proceeded, as has been suggested, by a molecular reaction since quantities of catalyst were required in excess of one mole per mole of acylating agent. It has been found in accordance with the present invention that zinc halides are unique in promoting the acylation of heterocyclics since they do not follow the mechanisms heretofore set forth for aluminum chloride and other Friedel-Crafts catalysts. Thus, it has been found that quantities of zinc halide present in amounts less than one mole per mole of acylating agent, referred to throughout the specification and appended claims as "small amounts", are excellent catalysts for promoting the acylation of thiophene, furan, and derivatives thereof. There is apparently no lower limit as to the quantity of zinc halide which will promote the acylation reaction. Extremely minute amounts, of the order of .0004 mole per mole of acylating agent have been found to be effective. The quantity of zinc halide used herein, accordingly, is not to be confined in its lower limit to any specific small amount, since even a trace of catalyst was found to promote the acylation reaction.

Acylated heterocyclics as produced in accordance with this invention have found a variety of uses and may be employed as solvents, dye intermediates, addition agents for petroleum fractions, plasticizers, odorants, perfume diluents, resin intermediates and intermediates for chemical synthesis. Long chain alkyl thienyl ketones and alkyl furyl ketones may also be utilized as synthetic lubricants, waxes, extreme pressure additives for mineral oils and anti-foaming agents.

We claim:

1. A process for acylating an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids in the presence of a small amount, less than one mole per mole of acylating agent, of a catalyst selected from the group consisting of zinc chloride, zinc bromide, and zinc iodide.

2. A process for acylating an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids in the presence of a small amount, less than one mole per mole of acylating agent, of zinc chloride catalyst.

3. A process for acylating an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids in the presence of a small amount, less than one mole per mole of acylating agent, of zinc bromide catalyst.

4. A process for acylating an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids in the presence of a small amount, less than one mole per mole of acylating agent, of zinc iodide catalyst.

5. A process for acylating thiophene, comprising reacting the same with an acylating agent selected from the group consisting of acyl halides and anhydrides of carboxylic acids in the presence of a small amount, less than one mole per mole of acylating agent, of zinc chloride catalyst.

6. A process for acylating thiophene, comprising reacting the same with an acylating agent selected from the group consisting of acyl halides and anhydrides of carboxylic acids in the presence of a small amount, less than one mole per mole of acylating agent, of zinc bromide catalyst.

7. A process for acylating thiophene, comprising reacting the same with an acylating agent selected from the group consisting of acyl halides and anhydrides of carboxylic acids in the presence of a small amount, less than one mole per mole of acylating agent, of zinc iodide catalyst.

8. A process for acylating an acylatable thiophene compound to yield a product having an acyl radical attached to the thiophene nucleus of said compound, which comprises reacting an acylatable thiophene compound with an acylating agent selected from the group consisting of acyl halides and anhydrides of carboxylic acids at a temperature between about −30° C. and about 150° C. for a period of from about 1 hour to about 10 hours, in the presence of a small amount, less than one mole per mole of acylating agent, of a catalyst selected from the group consisting of zinc chloride, zinc bromide, and zinc iodide.

9. A process for acylating thiophene, which comprises reacting the same with an acylating agent selected from the group consisting of acyl halides and anhydrides of carboxylic acids at a temperature between about −30° C. and about 150° C. for a period of from about 1 hour to about 10 hours, in the presence of a small amount, less than one mole per mole of acylating agent, of a catalyst selected from the group consisting of zinc chloride, zinc bromide, and zinc iodide.

10. A process for acylating thiophene, comprising reacting thiophene with an anhydride of a fatty acid in the presence of a small amount, less than one mole per mole of said anhydride, of a catalyst of zinc chloride.

11. A process for preparing a di-acyl thiophene, comprising reacting a mono-acyl thiophene with an anhydride of a carboxylic acid in the presence of a small amount, less than one mole per mole of said anhydride, of a catalyst of zinc chloride.

12. A process for preparing acetyl thiophene, comprising reacting thiophene with acetic anhydride in the presence of a small amount, less than one mole per mole of acetic anhydride, of a zinc chloride catalyst.

HOWARD D. HARTOUGH.
ALVIN I. KOSAK.

REFERENCES CITED

The following references are of record in the file of this patent:

UNITED STATES PATENTS

| Number | Name | Date |
|---|---|---|
| 2,101,560 | Ralston | Dec. 7, 1937 |
| 2,432,991 | Hartough | Dec. 23, 1947 |

OTHER REFERENCES

Alles, J. Pharm. Exp. Ther. 72, 265 (1941).
Whitmore, "Organic Chemistry," p. 893, Van Nostrand, N. Y., 1937.
Richter, "Organic Chemistry," pp. 649–50, John Wiley, N. Y., 1938.
Caesar and Sachanen, Ind. Eng. Chem. 40, 922 (1948).